Figure 1:
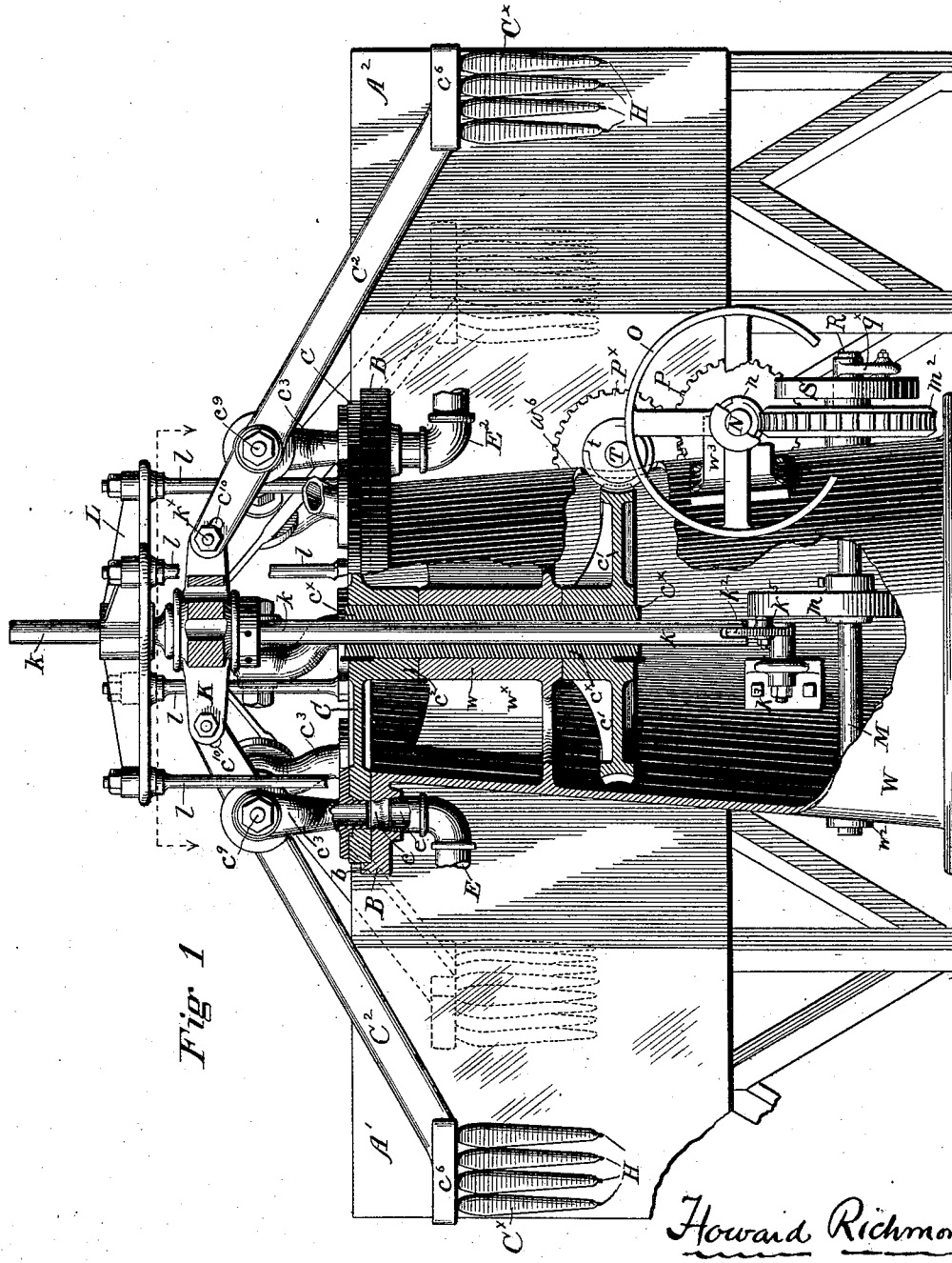

(No Model.) 6 Sheets—Sheet 1.

H. RICHMOND.
DYEING AND BLEACHING APPARATUS.

No. 387,540. Patented Aug. 7, 1888.

WITNESSES.

Howard Richmond
INVENTOR,
By his Attorneys.

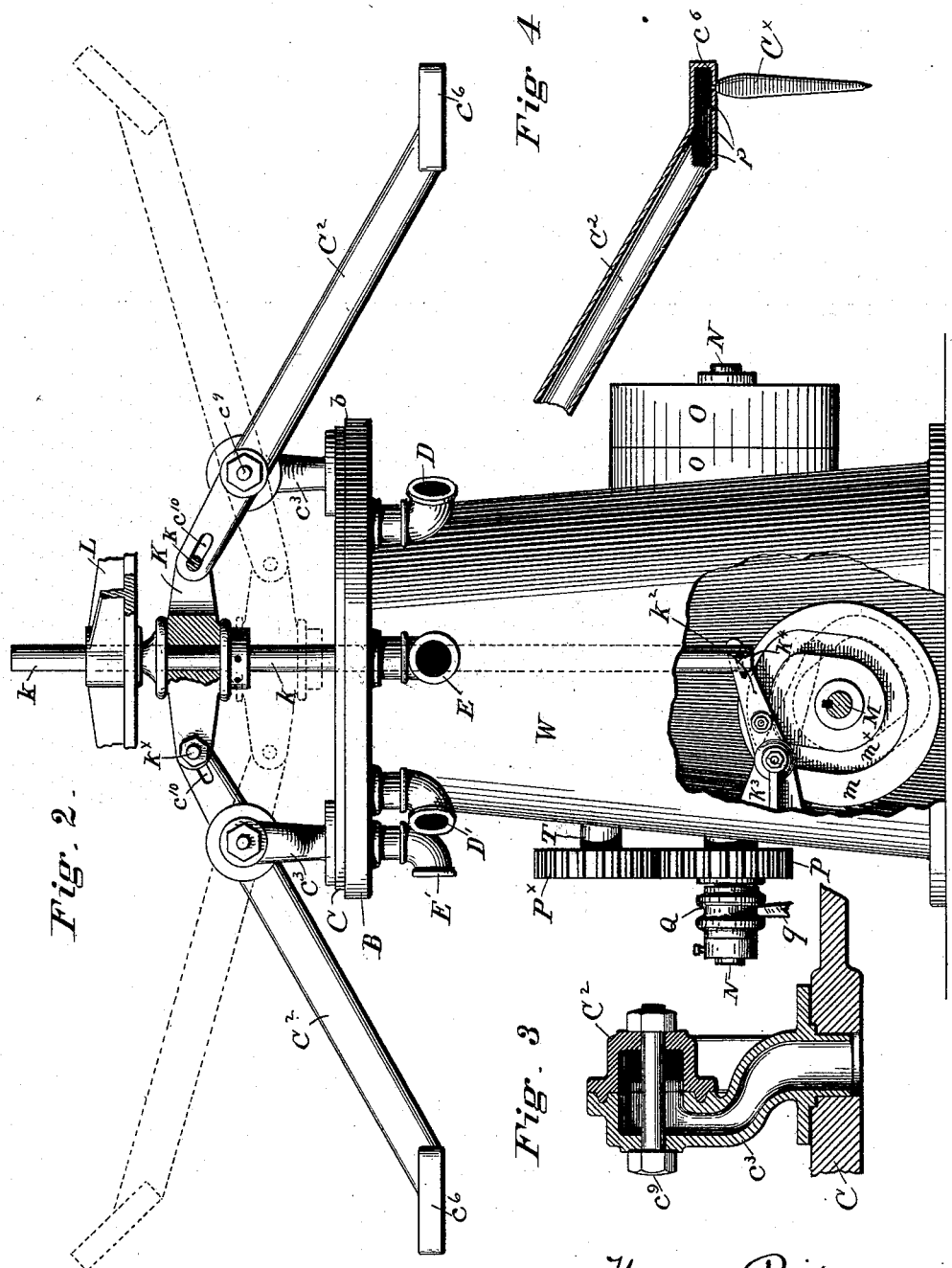

(No Model.) 6 Sheets—Sheet 3.

H. RICHMOND.
DYEING AND BLEACHING APPARATUS.

No. 387,540. Patented Aug. 7, 1888.

WITNESSES,
R. B. Shepherd.
F. Norman Dixon.

Howard Richmond,
INVENTOR,
By his Attorneys,

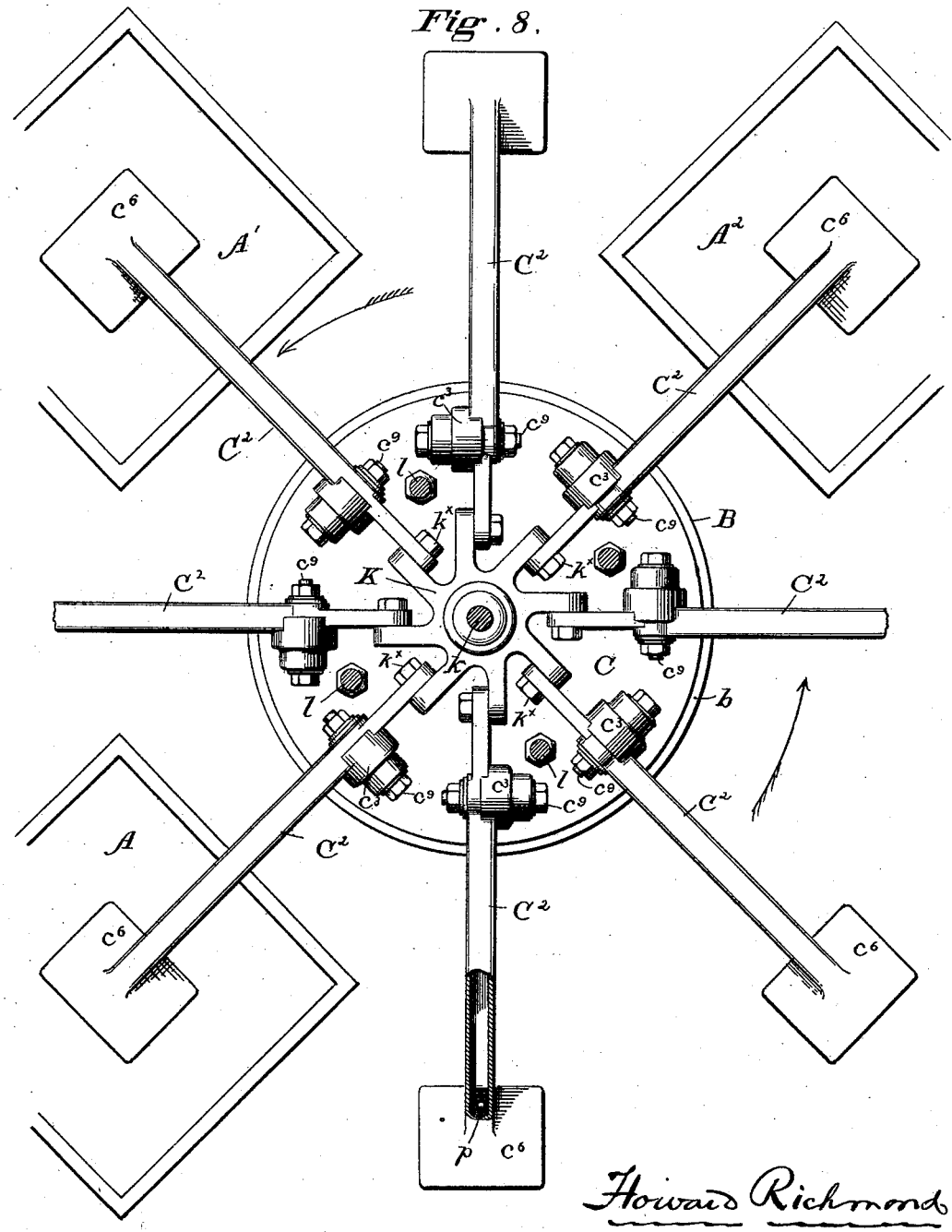

(No Model.) 6 Sheets—Sheet 5.
H. RICHMOND.
DYEING AND BLEACHING APPARATUS.
No. 387,540. Patented Aug. 7, 1888.

WITNESSES,

INVENTOR
Howard Richmond
By his Attorneys, (No Model.) 6 Sheets—Sheet 6.

H. RICHMOND.
DYEING AND BLEACHING APPARATUS.

No. 387,540. Patented Aug. 7, 1888.

WITNESSES.

INVENTOR,
Howard Richmond.
By his Attorneys,

UNITED STATES PATENT OFFICE.

HOWARD RICHMOND, OF PROVIDENCE, RHODE ISLAND, ASSIGNOR TO THE COP DYEING COMPANY, OF SAME PLACE.

DYEING AND BLEACHING APPARATUS.

SPECIFICATION forming part of Letters Patent No. 387,540, dated August 7, 1888.

Application filed December 21, 1887. Serial No. 258,571. (No model.)

*To all whom it may concern:*

Be it known that I, HOWARD RICHMOND, a citizen of the United States, residing in the city of Providence, in the county of Providence, and State of Rhode Island, have invented certain Improvements in Apparatus for Dyeing, Scouring, Bleaching, and otherwise Treating Yarns in Cops, of which the following is a specification.

My invention is of general applicability in dyeing, mordanting, bleaching, steaming, scouring, washing, drying, or otherwise treating yarns of cotton, silk, wool, worsted, or other animal or vegetable fiber, in the form of cops or in kindred compact forms, by either sucking or forcing liquid dyes, or other liquids used in dyeing, mordanting, bleaching, scouring, steaming, or otherwise treating the cops, through the cops when mounted upon hollow perforated tubes, skewers, or injection spindles, which extend respectively through the cops and render every portion of each cop subject to the action of said liquids.

The foregoing operations broadly as such, and as separately conducted in different machines, are not novel with me, and attempts have heretofore been made, thereby, to practically dye, bleach, and otherwise treat, cotton and other yarns in cops and other compact forms. So far, however, as my knowledge extends, the practice has never been practically or successfully conducted upon a commercial scale, until the date of an invention made by one August Graemiger, a citizen of the Republic of Switzerland, application for patent for which was filed in the United States Patent Office upon April 14, 1887, upon which application Letters Patent of the United States No. 368,715, were granted upon the 23d day of August, 1877, and to which Letters Patent reference is to be made.

My present invention being an improvement upon the aforesaid invention of the said Graemiger, it is essential for an accurate understanding of the features of distinction, that the objects and purposes and the salient characteristics of Graemiger's invention aforesaid should be briefly stated.

The object of Graemiger's invention, which is of general applicability for dyeing, bleaching, scouring, mordanting, drying, and otherwise treating yarns of various kinds in cops and other compact forms, is the provision of means whereby all of the cops composing any given series or succession, regular or irregular, of cops or of tiers or groups of cops, may, in the selected series or succession,—as to each cop, tier or group, successively, but as to the entire series or succession of given cops, tiers, or groups, collectively,— be contemporaneously or simultaneously subjected each to its appropriate step of the contemporaneously conducted successive steps composing the selected process, of any one of which processes, however, continuity of operation in a greater or a less degree, is the especial desideratum and the salient characteristic.

To the foregoing ends the said Graemiger's said invention embraces apparatus having the capacity for performing or carrying out any one of several cognate processes or methods of treatment of yarn in cops or kindred compact forms, and apparatus, moreover, so constituted as to be readily convertible into, or applicable for use as, any one of several cognate yet distinct devices, respectively susceptible of the performance of a particular kind of work, that is to say of the practice of some one of the said several cognate processes, hereinafter mentioned, all of which, as processes or modes of treatment, are novel with Graemiger.

Broadly stated, Graemiger's aforesaid invention, so far as processes are concerned, as applied to dyeing, mordanting, bleaching, scouring, steaming, washing, or otherwise similarly treating by the impregnation of liquids, yarn in cops, comprehends, first, the contemporaneous but distributive subjection of the cops composing a series each in turn to its appropriate step of the following contemporaneously - conducted successive steps or operations, namely: first, saturation or impregnation by sucking or forcing the selected liquid through given cops; and, second, substitution of fresh cops to be charged for given charged cops.

Similarly, also, Graemiger's invention, as applied to the operations of impregnation above mentioned, comprehends, second, the subjection of the cops in the manner above stated, to the following successive steps or operations: First, saturation or impregnation by sucking or forcing the selected liquid through given cops; second, liquid exhaustion by forcing or sucking air or other suitable fluid through given charged cops; and, third, substitution of cops to be charged and liquid exhausted for given charged and liquid-exhausted cops.

Similarly, again, Graemiger's invention as applied to exhausting surplus liquid from charged cops, comprehends, third, the subjection of cops in the manner above stated, to the following successive steps or operations: First, liquid exhaustion by forcing or sucking air or other suitable fluid through the cops; second, substitution of cops to be liquid exhausted for given liquid exhausted cops.

Similarly, again, as applied to operations of dyeing with easily oxidizable liquid dyes, Graemiger's invention comprehends, fourth and fifth, the subjection of the cops in the manner above stated with reference to the first two operations which involve impregnation with liquids,—and in connection either with the two steps of saturation and substitution, which are involved in the practice of the first of his foregoing processes, or else in connection with the three steps of saturation, liquid-exhaustion, and substitution, which are involved in the second of his foregoing processes,—to a preliminary step of air-exhaustion before saturation or impregnation proper, by sucking or forcing air from out given cops to be charged or saturated.

Graemiger's invention further comprehends apparatus for conveniently effectuating the five several processes which respectively reside in the practice of the foregoing respectively recited connected steps or operations,—the salient characteristic of which is that it is a rotary apparatus the cop carrier of which is a conical or cylindriform band or strap, to the peripheral exterior face of which groups of radially projecting cops are applied, and which is mounted upon a fixed conical or cylindriform carrier body fixedly supported referably to a tank and containing or embodying the mouths of certain conduits which open through its peripheral face.

In order that the apparatus which Graemiger devised for the purpose of carrying into operation any one of the above mentioned processes or methods of treatment may be understood, it is proper to state briefly that Graemiger's machine comprehends; first, a fixed tank, vat, or other recipient for containing a given quantity of liquid coloring matter or other preferred liquid, and for subserving the purposes of a frame-work to the machine as an entirety; second, a carrier body which, referably to the fixed tank and the rotating cop carrier, is simply a fixed conical or cylindrical device subserving the double purpose, first, of being a fixed body with reference to, and upon or around, which the cop carrier has rotary movement; and, second, of being a body containing or embodying upon its peripheral surface, or of being a supporting device serving conveniently to present to the perforations in the cop carrier, the mouths or chambers of the conduits; third, a rotatable strap or band like encircling cop carrier, or device which carries radially projecting cops, which is mounted upon the peripheral surface of the carrier body, is perforated referably to the points of and means for attachment of said cops, and has such rotary movement referably to the carrier body and to the tank that its perforations are in predetermined continuing sequence placed in communication, preferably through perforated injection spindles, with the axial apertures of the cops on the one hand and with the peripherally opening conduit mouths and dead face on the other; fourth, a charging conduit in exterior communication with a suction or pressure pump, and interiorly or as to its mouth, conveniently through the intermediation of the carrier body, in communication for the time being with given perforations in the cop carrier; fifth, a liquid exhausting conduit in exterior communication with a suction or pressure pump, and interiorly or as to its mouth, conveniently also through the intermediation of the carrier body, in communication for the time being with other given perforations in the cop carrier; sixth, a dead face formed upon or embodied in the peripheral carrier surface of the carrier body, which, referably to the encircling cop carrier and as a dead face generically considered, is simply a, in any convenient manner suitably formed, blank or unchambered segment of the periphery of the carrier body, or a gap or opening in said periphery, or an open chamber in said periphery, so located above the level of the liquid in the tank as to act in connection with cops above said level,—calculated, in the preferred mode of employing the apparatus, for the time being to act in connection with yet other given perforations of the cop carrier and permit of the removal at a period subsequent to their treatment, of the cops applied to said perforations, and of the substitution of others in their stead.

Of the foregoing apparatus of Graemiger, the tank, the perforated cop carrier, the charging conduit, the liquid-exhausting conduit, and,—as a device of convenience merely, for the purpose of conveniently presenting to given perforations of the cop carrier the mouths of said conduits, and as a device, moreover, with reference to which the cop carrier is conveniently arranged to rotate,—the carrier body, are the vital members, elements, or instrumentalities.

In order to understand the operation of the said Graemiger apparatus it is sufficient to add that the cop carrier which, as stated, encircles or surrounds after the manner of a strap or band the carrier-body containing the peripherally presenting mouths of the conduits, rotates relatively to the tank and the carrier-body in such manner as, during a part of its rotation, to occasion the immersion in liquid in the tank of cops carried by it, and also, during a further part of its rotation, the presentation of its perforations with reference to which the cops are secured to it, to the mouths of the conduits.

My present invention is also an improvement upon a certain improved apparatus for dyeing, scouring, bleaching and otherwise treating yarn in cops, invented by the said Graemiger and constituting the subject-matter of an application for patent filed by the said Graemiger August 25, 1887, and patented to him November 8, 1887, in and by United States Letters Patent No. 372,795, which said apparatus, in that it is simpler and cheaper of construction, is an improvement upon the machine of the Graemiger patent No. 368,715, of August 23, 1887, and is to be contradistinguished from the said last-named patented machine essentially in the fact that its cop-carrier is constructed as a disk, to the front face of which the cops are applied, preferably at right angles; in the further fact that the carrier-body is also constructed in the form of a disk through the front face of which the mouths of the conduits, preferably in the form of recessed chambers, open, and are circumferentially distributed or placed at proper intervals, and radially disposed between the center and the circumference of said carrier-body; and in the further fact that the disk-shaped cop-carrier is caused to rotate in contact with the front face of the disk-shaped carrier body and in a plane parallel therewith.

In other respects than the above Graemiger's so-called disk machine embodies all of the essential features of the machine of his first patent, and is equally well adapted to effectuate the process which comprises charging and substitution,—or the process which comprises charging, liquid-exhaustion, and substitution,—or the process which comprises liquid-exhaustion and substitution,—or the process which comprises air-exhaustion, dyeing, and substitution,—or the process which comprises air-exhaustion, dyeing, liquid-exhaustion, and substitution,—and comprehends all of the elements which are necessary to the conduct or practice of any one of the foregoing processes, and consequently of that one which involves the greatest number of steps,—although, as is hereinafter explained, in the practice of such of the processes as involve the lesser number of steps, certain of the elements of the said apparatus are inert or for the time being thrown out of action.

My present invention is also an improvement upon a certain improved apparatus for dyeing, scouring, bleaching and otherwise treating yarn in cops invented by me and constituting the subject-matter of an application for patent filed by me August 30, 1887, and patented to me November 8, 1887, in and by United States Letters Patent No. 372,768 which said apparatus is to be contradistinguished from the machines of both of the Graemiger patents referred to essentially in the fact that its cop-carrier is of such construction and general organization as to be adapted to be vibrated, oscillated, rocked, or see-sawed, as opposed to being rotated or moved in a circular plane.

My said last named improved machine is, moreover, equally with either of the Graemiger machines referred to adapted to effectuate the several processes already referred to which are carried into operation by either one of the Graemiger machines.

The special object of my present invention is the organization of a machine in which the cops composing each group of cops can be successively subjected to the action of different kinds of charging or impregnating liquids, and be, between each operation of charging, liquid-exhausted of the liquid last charged into them;—the machine being in effect a compound machine formed, to speak generally and not literally, of two or more machines each embodying the general organization of Graemiger's, but all so united as to co-operate as an organized single machine and be capable of performing upon an extended scale and with several different charging liquids such an operation as can be performed upon a more limited scale and with but a single liquid upon such patented machines as have been hereinbefore referred to.

To illustrate:—In order, by the use of any of the patented machines referred to, to dye cops cutch brown, it is necessary to charge the cops with the cutch upon one machine,—to mordant the charged cops upon a separate machine,—and to wash the charged and mordanted cops upon a third separate machine. Now, by the employment of one such a machine as is represented in the accompanying drawings, the entire operation of commercially dyeing cutch brown, which involves both mordanting and washing, can be performed upon it, and the operation itself be continuously conducted as to a succession of freshly supplied groups of cops.

To the foregoing ends, my invention comprehends and utilizes, in an organized machine for dyeing, scouring, bleaching, and otherwise treating, yarns in cops, the following instrumentalities, namely:—First, a series of radially or circumferentially disposed independent tanks; second, a series of charging conduits in communication with a corresponding series of charging pumps; third, a series of liquid-exhausting conduits in communication with one or with a preferably corresponding series of liquid-exhausting pumps; fourth, a rotatable, flat, or disk-like, horizontally-disposed cop-carrier provided with given perforations respectively in communication with the hollow interiors of given radiating cop carrying arms pivoted to the carrier-disk and adapted to be both intermittently rotated with said cop-carrier-disk, and, during the periods of rest in, or the intermissions of its rotary movement, to be vibrated, oscillated, or rocked; fifth, a fixed correspondingly-flat or disk-like horizontally disposed upwardly facing carrier body upon the face of which, as a supporting platform, the cop carrier disk is mounted and rotates, and which as to said face contains or embodies the mouths of the charging and liquid-exhausting conduits and a dead-face, over which mouths and dead-face the perforations of the carrier, which, as stated, are in communication with the hollow interiors of the cop-carrying arms, are caused to successively present as the carrier-disk rotates; sixth, suitable operating gearing for intermittently rotating the cop-carrier-disk and its applied arms, and which I herein generically term, intermittent cop-carrier-rotating gearing; seventh, suitable operating gearing for intermittently vibrating, rocking, or oscillating, the cop-carrying arms of the cop-carrier disk, and which I herein generically term, intermittent carrier-arm-rocking gearing; and, eighth, as a preferred but not essential element, suitable connective gearing for conjointly operating, in predetermined concomitance, said intermittent cop-carrier-rotating gearing and said intermittent carrier-arm rocking gearing,—which connective gearing I herein generically term, prime-mover-gearing.

A machine conveniently and cheaply embodying my invention and adapted to effectuate the simultaneous but successive subjection of cops to the action of three separate charging liquids, for example a liquid dye, a liquid mordant, and a washing liquid,—is represented in the accompanying drawings and described in this specification, the particular subject-matter claimed as novel being hereinafter definitely specified.

The machine represented in the drawings, it may be premised, is one in which the cop-carrier is provided with eight cop-carrying arms, in which there are three independent tanks, three independent charging conduits, three preferably independent liquid-exhausting conduits, and two dead-faces, or a double dead-face, to act in connection with two cop-carrying arms at the same time. It is, however, to be understood that while the machine of the foregoing organization is, for various practical reasons, a machine of very desirable capacity,—being that of three separate chargings,—my invention is not restricted to a machine having any specific number of tanks, cop-carrying arms, charging conduits, liquid-exhausting conduits, or dead-faces; and that while less than eight arms, three tanks, three charging conduits, three liquid-exhausting conduits, and two dead faces, may be employed,—larger numbers may equally well be employed, the number of arms, however, being, preferably, always in excess of the total number of both charging and liquid exhausting conduits, while the tanks always correspond in number with the number of charging conduits employed.

Figure 6:
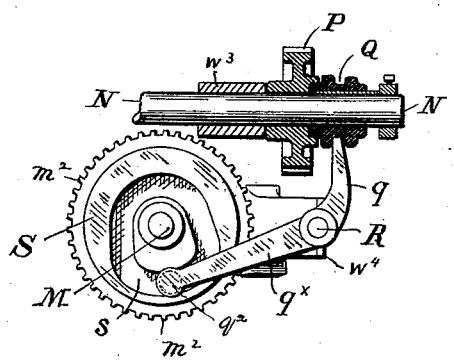
Figure 7:
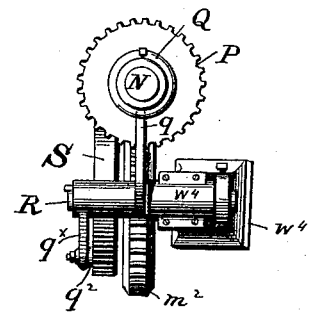
Figure 5:
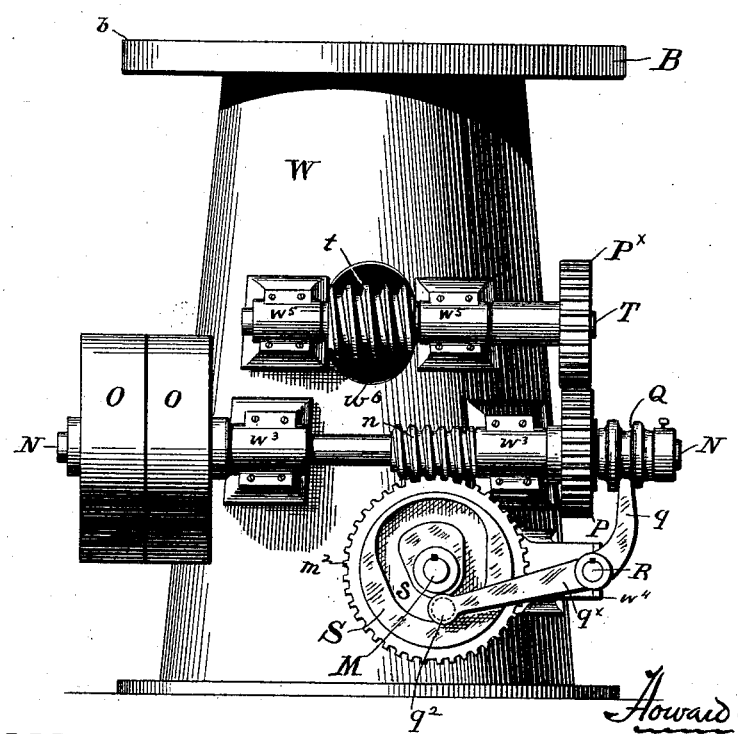
Figure 9:
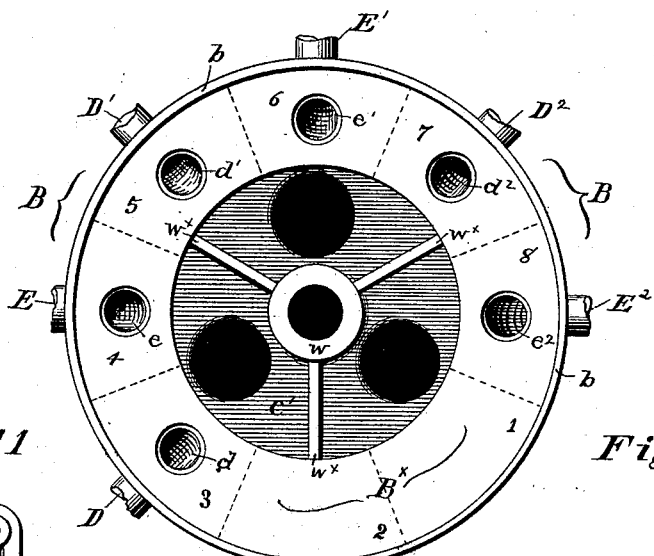
Figure 11:
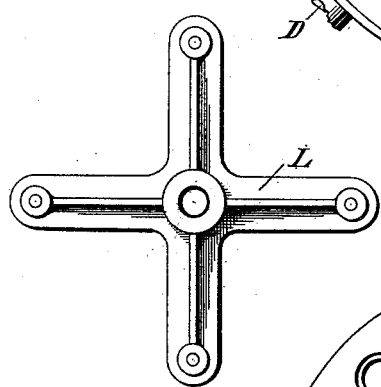
Figure 12:
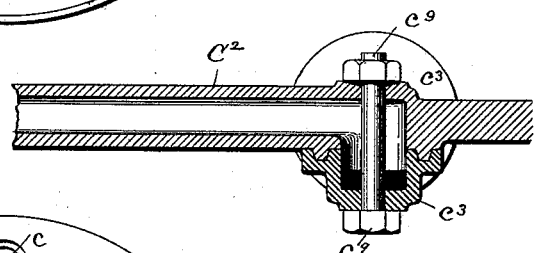
Figure 10:
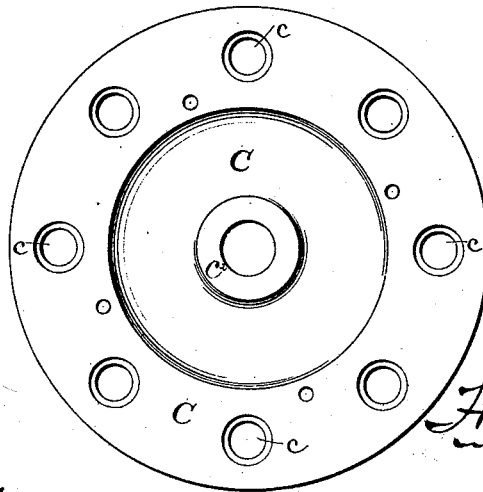
Figure 13:
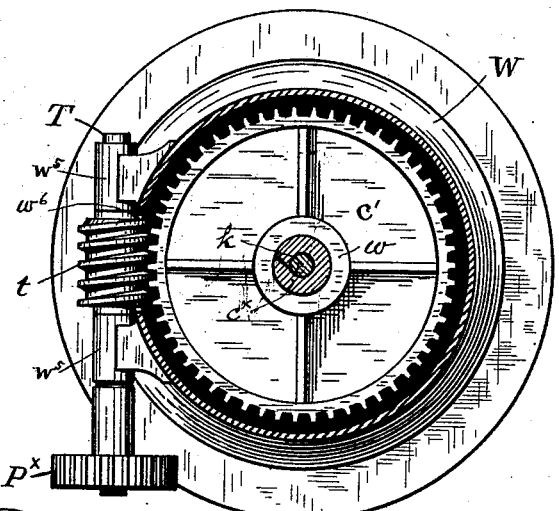
Figure 15:
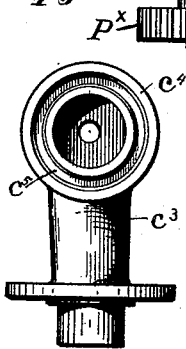
Figure 16:
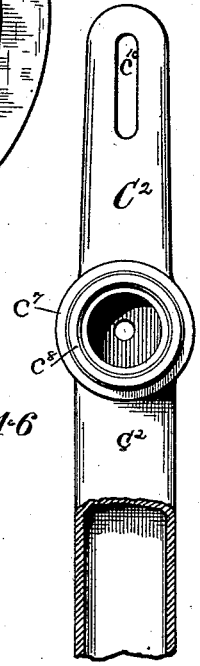
Figure 14:
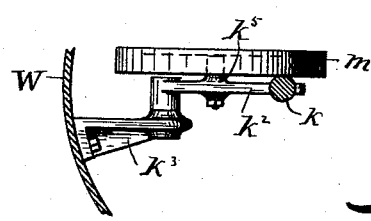

In the accompanying drawings, Figure 1 is a front elevational view, partially sectional and partially broken away, the better to illustrate construction, of a cheap and convenient form of my entire apparatus. Fig. 2 is a side elevational view, partially sectional and partially broken away, of the housing or standard of the apparatus and of the cop carrier and its cop-carrying arms, the latter being represented respectively in dotted and full lines in their respective elevated and depressed positions. Fig. 3 is a fragmentary, transverse, sectional, elevational detail, of one of the tubular fulcra of the cop-carrying arms, of the arm operating in connection therewith and of a portion of the cop-carrier-disk. Fig. 4 is a fragmentary, longitudinal, sectional, side elevation of the outer portion of one of the cop-carrying arms and the cops which it carries. Fig. 5 is a right hand side elevational view of the standard or housing represented in Fig. 1, the conduits and the cop carrier and its arms being removed. Fig. 6 is a fragmentary side elevational detail of a portion of the gearing for occasioning the intermittent rotation of the cop carrier, it being a view of the sliding clutch upon the driving shaft and of the clutch lever, clutch rocker, and clutch cam on the cam shaft for operating said sliding clutch. Fig. 7 is a right hand end elevational view of the devices represented in Fig. 6. Fig. 8 is a plan view of the cop carrier and cop-carrying arms and of the tanks which are disposed about them. Fig. 9 is a top plan view of the carrier body, divided, for purposes of explanation as hereinafter referred to, by radial dotted lines, into segments of sectors, and showing the mouths of the conduits and dead face. Fig. 10 is a top plan view of the cop carrier, the tubular fulcra of the arms and the cap-supporting pillars being removed. Fig. 11 is a top plan view of the spider-cap-bearing for the plunger rod. Fig. 12 is a longitudinal, horizontal, sectional plan of a portion of one of the cop-carrying arms and of its tubular supporting fulcrum. Fig. 13 is a plan view of the carrier worm-wheel and of the counter shaft and carrier worm upon said shaft for driving said worm-wheel. Fig. 14 is a top plan view of the plunger cam, cam rocker, and rocker bracket, for operating the plunger rod. Fig. 15 is a face view of one of the tubular fulcra of the carrying arms. Fig. 16 is a fragmentary inside face view of a portion of one of the carrying arms.

Similar letters of reference indicate corresponding parts.

A A' A², Figs. 1 and 8, are a series of three radially disposed or circumferentially distributed tanks or receiving vessels to contain liquids. These tanks are independent of each other and distributed at predetermined distances, circumferentially considered, apart, and each at the same radial distance from a fixed housing which supports the carrier body and constitutes the supporting frame work of the apparatus.

The cop carrier, as hereinafter explained, has movement referably to the tanks, while the carrier-body is referably thereto a fixture centrally within their circumscribing circle.

W is a fixed housing, being conveniently, as shown, a hollow standard in the form of a truncated cone, which is fixedly erected from a bed plate or the ground, and which serves to support the carrier-body, the extremital portions of the conduits the mouths of which are embodied in said carrier-body, and the cop-carrying-arm-provided cop-carrier which is superimposed upon said carrier body,—and which serves, moreover, to contain or support, as the case may be, suitable gearing for rotating the cop-carrier, suitable gearing for rocking the cop carrying arms, and, if desired, the prime-mover gearing for actuating the gearing aforesaid. The form of this housing or standard is not material, and many supporting frame-works of various forms may be substituted for the specific housing represented in the drawings. Such a housing as is represented is, however, such a one as I prefer to employ.

B is the carrier body, preferably a casting integral with the housing and made in the form of an open centered horizontally-disposed disk, or outwardly-projecting or overhanging horizontal flange circumscribing the upper edges of said hollow housing. The carrier body is conveniently provided with an upturned peripheral rim $b$.

In Fig. 9 I have represented in plan the upturned carrying face of the carrier body and have, for convenience of description, illustrated said face as divided by radial dotted lines into eight segments of sectors, respectively numbered 1, 2, 3, 4, 5, 6, 7, and 8. Of these sectors, it may be simplest now to state, those numbered 1 and 2 are dead-faces; those numbered 3, 5, and 7, contain or embody the mouths of the three charging conduits; and those numbered 4, 6 and 8, the mouths of the liquid-exhausting conduits. The tanks face and are,—preferably, radially aligned with the segments embodying the mouths of the charging conduits,—namely, numbers 3, 5, and 7; their position being distinctly shown in Fig. 8.

D D' D² are three charging conduits the mouths of which open through the carrier body, and which lead to or are exteriorly in direct communication each with a separate suction or pressure pump, of any preferred character, adapted either to suck or to force any desired liquid through said conduits for the saturation, impregnation, or charging of given cops.

E E' E² are three liquid-exhausting conduits the mouths of which open through the carrier body intermediately between the respective mouths of the charging conduits, and which lead to or are exteriorly in direct communication preferably each with a separate suction or pressure pump, of any preferred character, adapted either to suck or to force air, or other fluid employed as a liquid-exhausting medium, through said liquid-exhausting conduits.

I have not represented in the drawings the pumps referred to, for the reason that it is not necessary to an understanding of the invention,—the pumps being simply, as stated, of any preferred and well known character, and there being no connections other than those which a competent mechanic would naturally employ.

The mouths of the charging conduits, which are in effect holes or perforations through the substance of the flat-faced circumferential flange which forms the carrier-body, are designated $d$ $d'$ $d^2$, while the mouths of the liquid exhausting conduits, which are similar holes or perforations similarly formed through the carrier-body, are designated $e$ $e'$ $e^2$. All of these mouths are preferably holes of the same diameter, all are radially disposed at the same distance from the center of the carrier-body, and all are circumferentially disposed at the same distance apart in contiguous sectors of the carrier-body,—their relative positions in the carrier-body represented in the drawings being best understood by a reference to Fig. 9.

There is of course no connection between the respective conduits themselves, between the mouths of the respective charging conduits and the liquid-exhausting conduits, or between the mouths of the last-named conduits and those of the charging conduits. Instead of making these conduit mouths in the form of holes approximating in diameter the diameters of their respective conduits, it is, as is apparent, quite possible to make them in the form of distinct or disconnected chambers, sunken portions, recesses, or depressed compartments, in the carrying face of the carrier-body, having respectively upon all sides continuous edge boundaries being the unchambered or unrecessed bounding portions of the level or true carrying-face of said carrier-body against which face the cop carrier is mounted and rotates. There is, however, no advantage in such a construction, and that represented is the best of which I have knowledge.

Lying, considered with reference to the direction of the movement of the cop carrier indicated by the arrows in Fig. 8, beyond the segment of the carrier-body marked 8 which contains the mouth of the third or last liquid-exhausting conduit, and intermediately between said segment numbered 8 and the segment numbered 3 which contains the mouth of the first charging conduit, is, in the form of carrier body depicted, a blank sectoral area composed of the two sectors 1 and 2, the same being a sectoral area of one-quarter the extent of the entire remaining face area of the carrier-body which I designate "the dead face $B^\times$", and which is in communication with no one of the mouths of the charging or the liquid-exhausting conduits, nor yet with the conduits themselves, but which, referably to the cop carrier, is simply a blank surface calculated for the time being to present itself to such of the perforations in and tubular fulcra of the carrier arms hereinafter described as in the movement of said carrier happen to come over it. This dead face, generically considered, need not necessarily be, as it preferably is, a blank surface of the metal of the carrier body, but may be a sectoral or other opening or openings through said body. It is also entirely possible to employ the mouths of one or more of the liquid-exhausting conduits, or a sectoral face area of the carrier body adjacent thereto and radially aligned with the open spaces intermediate between the tanks, as the dead face generically considered,—it being manifestly apparent that it is possible to perform the operation of substituting fresh or untreated cops for liquid-exhausted cops over the mouth of any liquid-exhausting conduit, and even while the pump in exterior communication with said conduit continues in action, as the operation of the said pump could not prevent the said operation of substitution. Such use, however, of the mouth of an exhausting conduit as a dead-face is not desirable, because, as is obvious, the operation of the apparatus would thereby become much slower as it would be necessary to delay the act of substitution until the act of liquid exhaustion had been performed. I simply, therefore, instance the foregoing possibility of the apparatus the better to explain that the dead-face proper is any portion of, or region referable to, the carrier-body not included within the sectoral compass of, or area occupied by, the mouth or mouths of the charging conduits.

In the claims the term dead-face is used in a generic sense, and not as restricted to the special dead face $B^\times$.

Having now described the construction of the carrier-body, and how that it is a convenient device for the purpose of conveniently presenting to given perforations in and tubular fulcra of the hollow cop-carrier arms—the dead face, the terminal portions or mouths of the charging conduits, and the terminal portions or mouths of the liquid-exhausting conduits,—and a device, moreover, with reference to which the carrier is conveniently arranged to rotate,—I pass to a description of the cop-carrier, which is essentially composed of a carrier-disk provided with hollow cop-carrying rocking arms, and is preferably of the following specific construction:—

C is the cop-carrier-disk, a circular flat disk fitted and mounted for rotary movement upon and against the upturned carrying-face of the carrier body which it is conformed to exactly fit and to the peripheral rim of which it extends. Rotation may be imparted to the cop carrier in any convenient manner, but I prefer to resort to the following means:—From the under face of the cop-carrier-disk projects a central annular hub $c^2$ which bears upon a vertical tubular sleeve bearing $w$ centrally supported within the hollow housing by radial webs $w^\times$. The hub contains or is fitted with a tubular carrier bushing $c^\times$ which is keyed to it, and which passes down snugly through the sleeve-bearing $w$ in the housing, projecting below said bearing and as to its projecting extremity equipped with a carrier worm-wheel $c'$ keyed to it.

It is obvious that rotation imparted to the carrier worm-wheel will, through the carrier bushing, be transmitted to the cop carrier disk. Suitable means by which rotation may be intermittently imparted are hereinafter described. Any suitable packing material is preferably inserted between the cop-carrier-disk and the carrier body, in order to make tight contact between them.

$c$ are a series of eight perforations through the substance of the cop-carrier-disk. All of these perforations are preferably holes of the same diameter, all are radially disposed at the same distance from the center of the carrier body, and all are circumferentially disposed at equal distances apart. These holes correspond in diameter and in radial and circumferential distribution with the mouths of the conduits, so that, when the carrier-disk is caused to rotate upon the carrier-body, six of the perforations in the disk register coincide or align themselves with the six conduit mouths in the carrier-body, while the remaining two perforations in the disk register coincide or align themselves with or come over the dead-face. This relationship of the perforations to the conduit mouths and dead-face is maintained whichever be the particular perforations respectively in alignment with given conduit mouths.

$c^3$ are a series of what I term tubular fulcra for the cop-carrying arms, the same being curved hollow standards, shown in detail in Figs. 3 and 15, fixedly erected respectively over and in continuation of the respective perforations $c$ in the cop carrier-disk. The upper extremity of each of these fulcra is provided with a circular bearing face $c^4$, Fig. 15, provided with a circular concentric wearing groove $c^5$, Figs. 15 and 3.

$C^2$ are the cop carrying arms, eight of which are represented, and which are well made when of the form and proportions represented in the drawings. Each of these arms is hollow and at its outer extremity conveniently provided with a hollow transversely extended box or compartment which I term a wing $c^6$. Each of these arms is also provided with a circular bearing face $c^7$, Fig. 16, corresponding with the bearing face $c^4$ of its tubular fulcrum, and provided with a circular wearing tongue $c^8$ adapted to the wearing groove $c^5$ in the bearing face of said fulcrum. Connection between each arm and its fulcrum is conveniently effected, and the respective bearing faces maintained in close frictional contact, by means of a fulcrum bolt $c^9$ passing through both the arm and its fulcrum in coincidence with the imaginary common axis of their respective bearing faces.

It will now be understood, inasmuch as the tubular fulcra are rigidly fixed to the cop carrier-disk and the cop-carrying arms rigidly connected with their respective fulcra,—notwithstanding that connection is of such character that the arms are susceptible of being rocked, vibrated, or oscillated, with respect to their fulcra,—that the carrier-disk and arms are a connected whole and that rotation imparted to the disk will also be imparted to the arms with which it is thus, as aforesaid, provided.

It will also be understood that the hollow interiors of the arms are in communication respectively with the hollow interiors of their supporting fulcra, which latter interiors, as already explained, are simply continuations of the perforations $c$ in the carrier-disk,—and that, therefore, when any particular perforation in the carrier-disk is in alignment with any particular conduit, direct communication is established between said conduit and the hollow interior of the carrying-arm in question and its connected wing, and this notwithstanding what may be the position of the arm in question with respect to its susceptibility of being rocked.

The wings of the cop-carrying arms are conveniently of the form represented in the drawings, but may be of any preferred form, and they possess a considerable under face-area, and are as to said area provided with any preferred series of perforations $p$ passing through from said under face into their hollow interiors, the office of which is to permit the passage of impregnating liquid or liquid-exhausting fluid to or from cops $C^x$ applied to said exterior under face of said wings and as to their hollow cores in communication with said perforations. The perforations $p$ may be of any desired form; those shown are simply holes through the under surface of the wings, which are conveniently threaded to receive hollow nipples fitted to receive removable perforated injection tubes H thrust through the cops and conveniently of a construction invented by the said Graemiger and constituting the subject matter of an application for patent filed by him February 8, 1887, as Serial No. 226,909, and likewise illustrated in the Graemiger Patent No. 368,715, referred to. Instead, however, of employing these nipples the injection tubes, or the cops themselves, may be adapted to be fitted directly to the perforations.

Each one of the cop carrying arms has internal projection beyond its fulcrum and is provided with a slot $c^{10}$. It will, therefore, be apparent that each arm is a lever of the first order, and that, if all of the internal projecting extremities of the arms be simultaneously raised or dropped, the outer extremities of the said arms and their wings will be likewise, but, of course, to a greater extent, raised or dropped. Such an action as the foregoing, which is herein termed vibration, rocking, or oscillation, is preferably imparted to all of the cop-carrying arms simultaneously, and may be imparted by many mechanical devices any one of which would constitute what I generically term carrier-arm-rocking gearing. This specific intermittently operating gearing represented and hereinafter described is such as I prefer for this purpose, but as specific gearing it is not of the essence of my invention, I do not here lay claim thereto.

The gearing in question used by me is of the following construction:—

K is what I term a reciprocating plunger head for connecting or yoking together the projecting inner extremities of all of the cop-carrying arms. This plunger head is conveniently made in the shape of a spider yoke as shown in Fig. 8, and is fixedly supported upon and connected with a vertically disposed plunger rod $k$, extending, for stability of construction only, above it through a spider cap bearing L erected upon bearing pillars $l$ springing from and carried by the cop carrier-disk, and extending, also, freely but snugly downward through the tubular bore of the carrier bushing $c^x$ and to some distance below said bushing.

Connection between the inner extremities of the cop-carrying arms and the plunger head is conveniently effected by head bolts $k^x$, which, while rigid in the head, pass freely through the slots $c^{10}$ in the arms. It is obvious that the plunger rod, while free for vertical movement in either direction, is stayed by and between its bearings in the spider cap L and in the carrier bushing $c^x$, and that, when said plunger rod is thrust upward the carrier arms are caused to descend, and when said rod is drawn downward said arms are caused to ascend.

Many devices for raising and lowering the plunger rod may be resorted to. Any one of them would constitute what I herein generically term carrier-arm-rocking gearing. No one of them specifically considered is of the essence of this invention. I prefer to employ a cam rocker $k^2$, pivoted at its inner extremity to a rocker bracket $k^3$ supported from inside the standard, and below the lower extremity of the plunger rod. At its outer extremity this cam rocker is slotted and connected with the plunger rod by a connecting pin $k^4$ fixed to said plunger rod and passing freely through said slot; and between its extremities said rocker is provided with a laterally projecting cam-way roller $k^5$ entered in a cam groove $m^x$ formed in the side face of a cam, termed the plunger cam $m$, and mounted within the housing upon a transverse cam shaft M passing through the interior of said housing and journaled in bearings $w^2$ in the walls of said housing, as shown in Figs. 1, 2, and 5. The cam way groove in the plunger cam $m$ is of such path that, upon the rotation of said cam, the outer end of the cam rocker is caused to rock upward and downward, thereby raising and lowering the plunger rod, plunger head, and cop-carrying arms. The path of the cam way groove is also such that a dwell of the rocker is occasioned both when it and the plunger-head are fully raised and are fully depressed, and this is in order to occasion the temporary maintenance of the wing extremities of the cop carrying arms both in their uppermost and in their lowermost positions.

Beyond one of its bearings (the right hand bearing, Fig. 1), the cam shaft is projected and equipped with a shaft worm wheel $m^2$ which is in constant engagement with a worm $n$ fixed on a transverse driving shaft N housed at right angles to the cam shaft in bearings $w^5$ secured to the exterior (in Fig. 1, right hand face) of the housing.

O are driving pulleys, of any usual character upon the driving shaft, N, by means of which rotation is imparted to it.

P is a driving toothed spur-wheel running free upon the driving shaft beyond its right hand bearing, Fig. 5, and Q is a sliding clutch feathered upon said driving shaft beyond said driving toothed spur-wheel P, and adapted either to engage with said spur wheel and render it fast to itself and consequently to the said driving shaft, or else to be disengaged therefrom and consequently to leave the said spur wheel loose upon said shaft.

The sliding clutch is conveniently operated by a clutch lever $q$, fixed upon a rock shaft R parallel with the cam shaft and housed in bearings $w^4$ mounted upon the exterior of the housing, and the rocking action necessary to cause said clutch lever to slide the clutch into or out of engagement with the driving spur wheel is imparted to said rock shaft by a clutch rocker $q^x$ hubbed upon said rock shaft and provided at its outer extremity with a laterally extending rocker roller $q^2$ traveling in the cam way groove $s$ formed in the outside face of a clutch cam S keyed upon the projecting extremity of the cam shaft M beyond the worm wheel $m^2$.

T is a counter shaft housed in bearings $w^5$ applied to the exterior of the housing, in parallelism with and above the driving shaft. The rear extremity of this shaft (the right hand end in Fig. 5) is fixedly provided with a driven toothed spur wheel $P^x$, the teeth of which are in constant engagement with the teeth of the driving toothed spur wheel P on the driving shaft, but which is, of course, only driven when said driving spur wheel is clutched fast upon its said shaft.

$t$ is a carrier worm fast upon the counter shaft T mid-way of its bearings, and engaged, through an opening $w^6$ formed through the housing, with the carrier worm wheel $c'$, which, as explained, is through the carrier bushing $c^x$ fixedly connected with the cop-carrier-disk. It is obvious that, when the driving spur wheel P is fast on the driving shaft N, the rotation imparted to the counter shaft T will, through the carrier worm and worm wheel, be transmitted to the carrier-disk. As, however, the counter shaft will stand still except when the sliding clutch renders the driving spur wheel fast on the driving shaft, it is apparent that the rotation of the carrier-disk will be intermittent and directly dependent upon the form of the cam way groove $s$ in the clutch cam S, which groove is of such path, and which cam is so timed or set upon its cam shaft, as to only occasion the rotation of the carrier-disk and the cop-carrying arms during the period when the plunger cam has acted to elevate the outer extremities of said cop-carrying arms. The path or form of the cam-way grooves in the respective plunger cam and clutch cam are subjects of workshop calculation, and intentionally such that there shall be both a dwell of the cam rocker $k^2$, which occasions the lifting and dropping of the cop carrying arms, both when said arms are raised and when they are lowered, and also a dwell of the clutch rocker $q^x$, which occasions the fastening or release of the driving spur wheel upon the driving shaft, both when said clutch is engaged and when it is disengaged. The relative mounting of the said plunger cam and said clutch cam on their respective shafts, is also by workshop calculation such that both the rise and fall of the cop-carrying arms take place when the cop-carrier-disk is stationary, while the rotation of said arms with the cop-carrier-disk takes place only when the cop-carrying arms are raised.

Such of the foregoing devices, or their mechanical equivalents, as occasion the raising and lowering of the cop carrying arms, constitute what I term intermittent carrier-arm rocking gearing; such as occasion the intermittent rotation of the cop-carrier-disk, or their mechanical equivalents, constitute what I term intermittent cop carrier-rotating gearing; and such as occasion the connected or concomitant operation of the gearings aforesaid, or their mechanical equivalents, constitute what I term prime mover gearing.

While, as stated, it is my preference to employ the specific mechanical devices described for the purposes set forth, because they are convenient and effectual for the accomplishment of such purposes, they are but types of many mechanical contrivances which may be resorted to for the same purposes.

Assuming the pumps operated as suction devices, the following is a description of the operation of my improved apparatus as represented and hereinbefore described, in carrying out the commercial process of dyeing cutch brown, which, as stated, is a process involving three separate chargings, three separate liquid-exhaustions, and, finally, the substitution of the separately charged and liquid-exhausted cops for fresh or untreated cops to be thrice charged and thrice liquid exhausted. The cutch brown dye is introduced into the first tank, a mordant into the second tank, and a washing liquid into the third,—in each case the level being above that to which the wings of the cop-carrying arms are caused to descend, or a level sufficient to permit of the immersion of the groups of cops applied to the respective wings of the cop-carrying arms.

The charging pumps, it should be observed, are preferably each provided with return pipes so as to each return to its tank as much of the liquid charged by it as is not absorbed by or does not remain in the cops, the several liquids being thereby in constant circulation from their tanks to their pumps and from the pumps back to the tanks or vice versa. In other words, a constant circulation takes place through both the charging pumps and the cops, and the liquids in the tanks are reduced only by such quantity of liquid as remains in the cops. The reduction however when carried to an extent affecting the normal level of the supply of liquid to the tanks is to be compensated for, and the level maintained, by fresh supplies. Two of the tubular fulcra of two of the arms of the cop carrier being, as two must always necessarily be, in registry with the dead-face, and the intermittent carrier arm-rocking gearing having operated to elevate all of the arms,—a cop is by an attendant supplied to each perforation in the wing of the foremost of the two elevated arms the fulcra of which happen, as stated, to be in registry with the dead-face, and the carrier with its arms still elevated is then by the intermittent cop-carrier-rotating gearing caused to rotate, in the direction of the arrows upon Fig. 8, a sufficient distance to bring the tubular fulcrum of the said foremost of the two arms, so, as aforesaid, supplied with cops, in alignment with the mouth of the first charging conduit, and consequently to bring said foremost arm into radial alignment with or position over the first of the tanks, or that which contains the dye stuff: The intermittent carrier-arm-rocking gearing in such position of the parts thereupon operates to occasion the descent of all of the arms and the consequent complete immersion in dye-stuff of the group of cops applied to the foremost arm the fulcrum of which is, as explained, aligned with the mouth of the first charging conduit:

The pump in connection with the dye-stuff charging conduit being, as is preferred, in operation as a suction pump, thereupon,—through the continuous passage formed through the hollow interiors of the submerged wing and its arm, the fulcrum of said arm, the perforation in the carrier disk to which said fulcrum is applied, the mouth of the charging conduit aligned therewith, and said charging conduit,—sucks enough of the dye stuff contained in the said first tank through the substance of each of the cops of the group immersed in said tank to occasion the saturation and impregnation with said dye-stuff of the threads composing each of said cops: The carrier-arm-rocking gearing at this stage of the operation acts to raise all of the cop-carrying arms and retain them raised a sufficient time to enable the attendant to supply the second cop-carrying arm which is in registry with the dead face with a group of fresh cops: Thereupon the intermittent cop-carrier-rotating gearing operates to occasion the further rotation of the cop-carrier and its elevated arms a sufficient extent to bring the tubular fulcrum of the arm the group of cops carried by which has just been impregnated with dye-stuff, into alignment with the mouth of the first liquid-exhausting conduit, and the tubular fulcrum of the succeeding arm which has just been supplied with cops into alignment with the mouth of the first or dye-stuff charging conduit: The intermittent carrier-arm-rocking gearing in such position of the parts thereupon operates to occasion the descent of all of the arms and the consequent complete immersion in the dye-stuff tank of the group of cops applied to the second arm the fulcrum of which, as explained, is for the time being aligned with the mouth of the first or dye-stuff charging conduit.

The pump in connection with the first liquid-exhausting conduit being, as is preferred, in operation as a suction pump, thereupon, through the continuous passage formed through the hollow interiors of the foremost wing and arm (or that one which has descended between the first and the second tanks and not descended into a tank), the fulcrum of said arm, the perforation in the carrier-disk to which said fulcrum is applied, the mouth of the liquid-exhausting conduit aligned therewith, and said liquid-exhausting conduit,— exercises its power of suction to exhaust the said cops of said foremost arm of such surplus dye-stuff as they contain at the time of their emergence from the dye-stuff in the first tank. Thereupon all of the arms are again raised and caused to dwell in their elevated position, and during the dwell the leading arm in registry with the dead-face is supplied with fresh cops: Thereupon the carrier and arms are caused to again rotate a sufficient distance to occasion the registry of the arm first considered, and which has just been liquid-exhausted of surplus dye-stuff, with the mouth of the charging conduit operating in connection with the second tank or that which contains the mordant; to occasion the registry of the arm second considered, and the cops of which have just been charged with dye-stuff in the first tank, with the mouth of the first liquid-exhausting conduit; and to occasion the registry of the arm which has just been supplied with cops with the mouth of the first or dye-stuff charging conduit;—whereupon the arms are caused to descend, and the cops carried by the arm first considered subjected to an operation of impregnation with mordant, while the cops of the arm just charged with dye in the first tank are liquid-exhausted between the tanks, and the cops of the arm just supplied with fresh cops impregnated with dye-stuff in the first tank by the action of the first charging pump.

A continuance, more or less rapid at will, of the foregoing operation will, as is apparent, eventually occasion the subjection of the cops of each group in turn to an operation of charging with dye stuff, to an operation of charging with mordant, and to an operation of charging with washing liquid, and after each of the foregoing charging operations to a separate operation of exhaustion of the surplus of the liquid last charged into them,—substitution of fresh or untreated cops for those treated being meanwhile effected between the last operation, namely, that of the exhaustion of the washing liquid, and the first operation, namely, that of impregnation with the dye-stuff, and the entire operation being a continuous one and one involving but a single (instead of several) handling of the cops.

The foregoing operation is simply instanced as a type, and it is, of course, apparent that the tanks may at will be charged with liquid of various kinds, and, accordingly as they are charged, the operation itself be caused to vary.

Considering the foregoing operation in its entirety, it will be observed that, after all eight of the arms have once been supplied with cops, the operation will be maintained as a continuous one by supplying, at each dwell of the arms in their elevated position, the foremost arm upon the dead-face, or that arm the fulcrum of which is in registry with the sectoral area marked 2 on Fig. 9, with cops, and by at the same time removing the treated cops from that arm which for the time being is in registry with the sectoral area of dead face marked 1 in Fig. 9; and that, upon each operation of the carrier-arm-rocking gearing to occasion the descent of all of the arms, the cops carried by three of the arms are simultaneously charged with the appropriate liquid, while the cops carried by three other of the arms are simultaneously liquid-exhausted of such liquid as has been last charged into them. The object, therefore, of making the dead face in effect double, or of twice its necessary area, is to facilitate the operation of removing charged and liquid-exhausted cops and of supplying fresh cops to be charged and liquid-exhausted,—it being apparent that, if treated cops can be taken off one of the arms while untreated cops are being supplied to another, time will be economized.

I prefer as stated to conduct the foregoing operations by sucking both the several charging liquids and then the surplus liquid from the outer surfaces of the cops inward, but it is obvious that the same result can be secured by forcing impregnating liquid and liquid-exhausting fluid from the core of the cops outwardly to their surfaces. I prefer also to use pumps strictly as such to force or suck the liquids or fluids utilized, but any other forcing or liquid exhausting devices may be employed in the stead of pumps, and I therefore herein use the word pump generically.

While it is apparent that it is of advantage in a machine having an even number of arms to employ a dead-face of double the necessary area, I do not restrict myself to such a dead-face, as it is preferable when an odd number of arms are employed to have a dead-face of the same sectoral area as the areas respectively occupied by the mouths of the respective charging and exhausting conduits.

I have spoken of a dwell as taking place when the arms are elevated and also when they are depressed: This dwell need not involve absolute cessation of motion, as a slow rotation of the arms when either elevated or depressed would not prevent either the operations of charging, those of liquid exhaustion, or that of supplying and removing the cops; and this is also true in its relation to the action of lifting and depressing the arms. It is, however, preferable, as stated, that there should be an absolute dwell or cessation of movement at the times indicated.

I have hereinbefore used, and also in the claims use, such terms as "disks", "disk-like", and "disk-shaped", as applied to both the carrier-body and the cop-carrier, not, perhaps, in the strictest technical sense of these terms, but because of their general appropriateness to characterize devices having such general form as the cop-carrier and the carrier body represented preferably have,—the gist of the nature of which, so far as form is concerned, resides in the fact that they are each, for purposes of mechanical construction and operation, a flat body, preferably, of course, but not necessarily, circular in outline, and adapted, by reason of their flatness and general similarity of form, when placed and rotated in parallel planes, together to operate in essentially such manner as has hereinbefore been set forth.

The general idea of the construction of the carrier-body is that it should be a flat horizontal surface embodying circumferentially distributed perforations constituting the mouths of the conduits, upon which body, as a bearing surface, a correspondingly leveled or flattened cop-carrier, having perforations through it from face to face and equipped with radially extending cop carrying arms, is mounted so as to cover and inclose the mouths of the conduits, and relatively to which said carrier is caused to rotate in such manner as to cause certain of its perforations to successively coincide or register with the conduit mouths.

In the drawings I have represented the wings, so called, of the cop carrying arms as of a given form. It is manifest however, that these wings are not essentials, and that the cops may be applied direct to the outer extremities of the arms, be the form of said extremities what it may. The wings are, however, convenient in that, if desired, they may be made bodily removable from the arms for the more ready application and removal to or from them of the cops, or for repairs. Whatever their form may be, these wings, or their equivalents, must, however, be hollow or chambered, and be in communication as to their hollow interiors with the hollow interiors of the arms.

Having thus described my invention, I claim:—

1. In an apparatus of the class herein recited, the combination of a rotatable cop-carrier, provided with cop-carrying arms adapted to be vibrated, oscillated, or rocked,—a fixed carrier-body with reference to which the cop-carrier has movement,—conduits in exterior communication with pumps, and the mouths of which are embodied in the carrier-body,— and tanks circumferentially disposed with reference to the carrier-body,—substantially as set forth.

2. In an apparatus of the class herein recited, the combination of a rotatable cop-carrier, provided with cop-carrying arms adapted to be vibrated, oscillated, or rocked,—a fixed carrier-body with reference to which the cop-carrier has movement, and which is provided with a dead face,—conduits in exterior communication with pumps, and the mouths of which are embodied in the carrier-body,—and tanks circumferentially disposed with reference to the carrier-body,—substantially as set forth.

3. In an apparatus of the class herein recited, the combination of a rotatable cop-carrier having perforations and hollow pivoted cop-carrying arms applied in communication with said perforations and adapted to be vibrated, oscillated, or rocked,—a fixed carrier-body against the carrying face of which the cop-carrier rotates, and which as to said face contains or embodies the mouths of conduits, with which mouths the perforations of the carrier are caused to register as the carrier rotates,—and a series of tanks circumferentially disposed with reference to the carrier-body,—substantially as set forth.

4. In an apparatus of the class herein recited, the combination of a rotatable cop-carrier having perforations and hollow pivoted cop-carrying arms applied in communication with said perforations and adapted to be vibrated, oscillated, or rocked,—a fixed carrier-body against the carrying face of which the cop carrier rotates, and which as to said carrying face contains or embodies the mouths of conduits and a dead-face, with which mouths and with which dead-face the perforations of the carrier are caused to successively register as the carrier rotates,—and a series of tanks circumferentially disposed with reference to the carrier-body,—substantially as set forth.

5. In an apparatus of the class herein recited, the combination of a rotatable cop-carrier having perforations and hollow cop-carrying arms applied in communication with said perforations and adapted to be vibrated, oscillated, or rocked,—a fixed carrier-body against the carrying face of which the cop-carrier rotates,—charging conduits in exterior communication each with a separate suction or pressure pump and the mouths of which are embodied in the carrier-body,—liquid-exhausting conduits in exterior communication each with a suction or pressure pump and the mouths of which are likewise embodied in the carrier body respectively beyond the respective mouths of the charging conduits,—gearing for rotating the cop-carrier and causing its perforations to register successively with the mouths of the respective conduits,—and a series of tanks circumferentially disposed with reference to the carrier-body and the mouths of the charging conduits,—substantially as set forth.

6. In an apparatus of the class herein recited, the combination of a rotatable cop-carrier having perforations and hollow cop-carrying arms applied in communication with said perforations and adapted to be vibrated, oscillated, or rocked,—a fixed carrier-body against the carrying face of which the cop-carrier rotates and which presents or embodies a dead-face,—charging conduits in exterior communication each with a separate suction or pressure pump and the mouths of which are embodied in the carrier-body,—liquid-exhausting conduits in exterior communication each with a suction or pressure pump and the mouths of which are likewise embodied in the carrier body respectively beyond the respective mouths of the charging conduits,—gearing for rotating the cop-carrier and causing its perforations to register successively with the mouths of the respective conduits or with the dead-face,—and a series of tanks circumferentially disposed with reference to the carrier body and the mouths of the charging conduits, substantially as set forth.

7. In an apparatus of the class herein recited, the combination of a rotatable cop-carrier having perforations and hollow pivoted cop-carrying arms applied in communication with said perforations and adapted to be vibrated, oscillated, or rocked,—a fixed carrier-body against the carrying face of which the cop-carrier rotates, and which as to said face contains or embodies the mouths of conduits, with which mouths the perforations of the carrier are caused to register as the carrier rotates,—a series of tanks circumferentially disposed with reference to the carrier body,— cop-carrier rotating gearing,—and carrier-arm-rocking gearing,—substantially as set forth.

8. In an apparatus of the class herein recited, the combination of a rotatable cop carrier having perforations and hollow pivoted cop-carrying arms applied in communication with said perforations and adapted to be vibrated, oscillated, or rocked,—a fixed carrier-body against the carrying face of which the cop-carrier rotates, and which as to said carrying face contains or embodies the mouths of conduits and a dead-face, with which mouths and with which dead-face the perforations of the carrier are caused to successively register as the carrier rotates,—a series of tanks circumferentially disposed with reference to the carrier body,—cop-carrier-rotating gearing,— and carrier-arm-rocking gearing,—substantially as set forth.

9. In an apparatus of the class herein recited, the combination of a rotatable cop-carrier having perforations and a series of hollow pivoted cop-carrying arms applied in communication with said perforations and adapted to be vibrated, oscillated, or rocked,—a fixed carrier-body against the carrying face of which the cop carrier rotates, which as to said face contains or embodies the alternately disposed mouths of charging conduits and of liquid-exhausting conduits, and which also contains or embodies a dead-face, with which mouths and with which dead-face the perforations of the carrier are caused to successively register as the carrier rotates,—a series of tanks circumferentially disposed with reference to the carrier body and the mouths of the charging conduits,—intermittent cop-carrier-rotating gearing,—and intermittent carrier-arm-rocking gearing,—substantially as set forth.

10. In an apparatus of the class herein recited, the combination of a rotatable horizontally disposed cop-carrier having a series of circumferentially-disposed equi-distant perforations and a series of hollow radially-disposed pivoted cop-carrying arms applied as to their hollow interiors in communication with said perforations and adapted to be vibrated, oscillated or rocked,—a fixed horizontally-disposed carrier-body against the face of which the cop-carrier rotates and which as to said face contains or embodies the equi-distant circumferentially-disposed mouths of alternately disposed charging conduits and liquid exhausting conduits, less however in aggregate number than the number of cop carrying arms, and which also contains or embodies a dead-face, with which mouths and with which dead-face the perforations of the carrier are caused to successively register as the carrier rotates,—a series of tanks circumferentially disposed with reference to the carrier body and in such radial disposition with respect to the mouths of the charging conduits as to present themselves to those cop-carrying arms the hollow interiors of which are, for the time being, in registery with the mouths of the charging conduits,—intermittent cop-carrier-rotating gearing,—and intermittent carrier-arm-rocking gearing,—substantially as set forth.

11. In a machine of the class above recited, a carrier-body the working face of which is a plane containing or embodying, first, a series of separate mouths of charging conduits each opening within a given radial compass from the center of said face, second, a corresponding series of mouths of liquid-exhausting conduits similarly opening within the same radial compass from said center, and which, considered with reference to circumferential distribution, alternate with the mouths of the charging conduits, and, third, a dead face intermediate between the mouth of the last liquid exhausting conduit and that of the first charging conduit of said respective series, substantially as set forth.

12. In a machine of the class above recited, a carrier-body the working face of which is a plane containing or embodying, first, a series of separate mouths of charging conduits, second, corresponding series of mouths of liquid-exhausting conduits which, considered with reference to circumferential distribution, alternate with the mouths of the charging conduits, and, third, a dead-face intermediate between the mouth of the last liquid-exhausting conduit and that of the first charging conduit of said respective series,—in combination with a cop-carrier the working face of which is a plane corresponding with the face of the carrier-body and which is provided with a series of perforations in excess of the number of conduit mouths in said carrier-body,—substantially as and for the purposes set forth.

13. In an apparatus of the class herein recited, the combination to form a rotatable cop-carrier,—of a carrier disk having a series of equi-distant radially and circumferentially disposed perforations,—hollow tubular fulcra the hollow interiors of which register with the perforations aforesaid,—and hollow cop-carrying arms applied to said fulcra and respectively as to their hollow interiors in communication with the hollow interiors of the fulcra aforesaid, substantially as and for the purposes set forth.

14. In a machine of the class herein recited, the combination of a rotatable flat or disk-like cop-carrier having perforations in communication with which are pivotally applied hollow cop-carrying arms adapted to be vibrated, oscillated, or rocked,—a fixed correspondingly flat or disk-like carrier body against the face of which the cop-carrier rotates, and which as to said face contains or embodies the mouths of fixed conduits and a dead-face, over which mouths and which dead-face the perforations of the carrier are caused to successively present as the carrier rotates,—and a series of tanks circumferentially disposed with reference to the carrier-body and the mouths of the charging conduits,—substantially as and for the purposes set forth.

15. In an apparatus of the class herein recited, a series of tanks which partially circumscribe the carrier-body,—a disk-like horizontally-disposed carrier body erected within the partial circle formed by the circumscribing series of tanks, and embodying a sectoral face area constituting a dead face and opposite an interspace between the tanks,—conduits the mouths of which open independently of each other through the carrying face of the carrier-body, and which are conveniently independent holes in said face,—a disk-like cop-carrier, provided with hollow radially-projecting cop-carrying arms adapted to be oscillated, vibrated, or rocked, having circumferentially distributed perforations in communication with the hollow interiors of the cop-carrying arms, and adapted, in the rotation of the carrier, to register successively with the dead-face and with the conduit mouths,—cops applied to the outer extremities of the cop-carrying arms,—and suitable means for both rotating the cop-carrier and raising and lowering the arms,—substantially as set forth.

16. In a machine of the class above recited, in combination with a rotatable cop-carrier provided with arms adapted to be rocked, vibrated, or oscillated,—a plunger rod connected with the arms,—a plunger cam,—and a cam rocker, substantially as and for the purposes set forth.

17. In a machine of the class above recited, in combination with a rotatable cop-carrier provided with arms adapted to be rocked, vibrated, or oscillated,—a plunger rod connected with the arms,—a plunger cam and a cam rocker,—a worm wheel connected with the cop carrier,—an intermittently rotating counter-shaft provided with a worm engaging said worm wheel,—and gearing for intermittently operating said counter shaft,—substantially as and for the purposes set forth.

In testimony whereof I have hereunto signed my name this 16th day of December, A. D. 1887.

HOWARD RICHMOND.

In presence of—
HENRY BOWEN,
G. RICHMOND PARSONS.

Correction in Letters Patent No. 387,540.

It is hereby certified that in Letters Patent No. 387,540, granted August 7, 1888, upon the application of Howard Richmond, of Providence, Rhode Island, for an improvement in "Dyeing and Bleaching Apparatus," an error appears in the printed specification requiring the following correction: In line 39-40, page 1, the date "23d day of August, 1877," should read *23d day of August, 1887*, and that the said Letters Patent should be read with this correction therein that the same may conform to the record of the case in the Patent Office.

Signed, countersigned, and sealed this 25th day of September, A. D. 1888.

[SEAL.]

D. L. HAWKINS,
*Assistant Secretary of the Interior.*

Countersigned:

BENTON J. HALL,
*Commissioner of Patents.*